Figure 1:
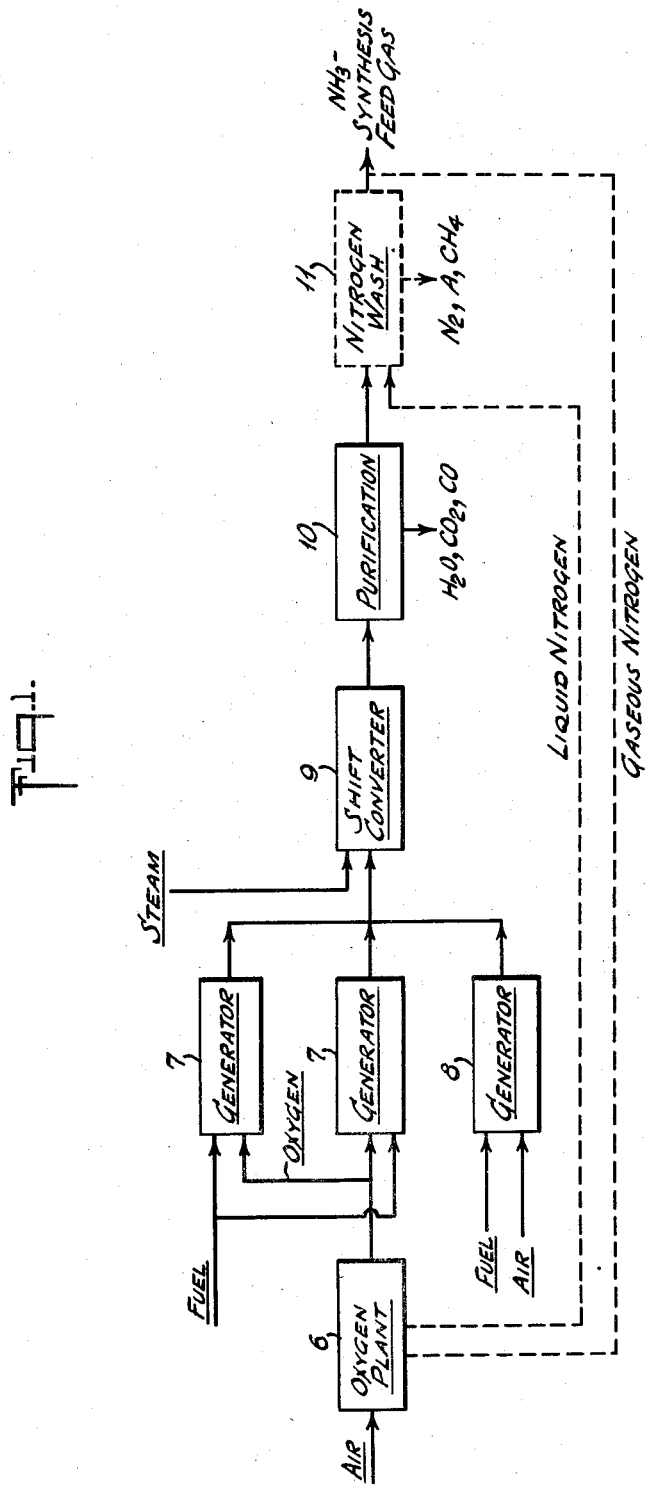

United States Patent Office 2,838,460
Patented June 10, 1958

2,838,460

PRODUCTION OF AMMONIA SYNTHESIS FEED GAS

William M. Stratford, New York, N. Y., assignor to The Texas Company, New York, N. Y., a corporation of Delaware Application December 23, 1955, Serial No. 554,964

8 Claims. (Cl. 252—376)

This invention relates to a process for the production of ammonia synthesis feed gas. In one of its more specific aspects, this invention relates to an improved method for the production of a mixture of hydrogen and nitrogen in the required proportions for the synthesis of ammonia.

This is a continuation-in-part of my application Serial No. 406,108, filed January 26, 1954, now abandoned, entitled "Production of Ammonia Synthesis Feed Gas."

In the synthesis of ammonia, a feed gas containing three parts hydrogen by volume per part of nitrogen is required. Various methods have been devised for the production of hydrogen for ammonia synthesis and for blending the hydrogen with nitrogen in the required proportions.

Fossil carbonaceous fuels and their derivatives, i. e. normally liquid and normally gaseous hydrocarbons and solid fuels, such as coal or coke, are most useful for the production of ammonia synthesis feed gas. These fuels may be used for the production of hydrogen by reaction with free, or uncombined, oxygen, optionally in the presence of steam. Partial oxidation of a fossil carbonaceous fuel produces a mixture of carbon monoxide and hydrogen. The carbon monoxide may then be reacted with steam to produce carbon dioxide and hydrogen; one volume of hydrogen is produced for each volume of carbon monoxide reacted. Following the addition of nitrogen and the removal of carbon dioxide and other undesired components, ammonia synthesis feed gas is obtained.

The present invention provides an improved process for the production of ammonia synthesis feed gas from fossil carbonaceous fuels. Solid, liquid or gaseous fuel may be used. In the process of this invention, carbonaceous fuel and free oxygen are reacted under conditions effective for the production of near maximum yields of carbon monoxide with concomitant production of hydrogen. Part of the fuel is reacted with substantially pure oxygen while another part is reacted with air. Each reaction is conducted under substantially optimum conditions, preferably in separate reaction zones. The same fuel or different fuels may be employed as feed for the air reaction zone and for the oxygen reaction zone.

Preferably the relative proportions of the reactants, i. e. fuel, air, oxygen, and, optionally, steam, employed in the various reaction zones are such that the combined products of reaction from all of the reaction zones contain carbon monoxide, hydrogen and nitrogen in relative amounts such that the sum of the carbon monoxide and hydrogen by volume is approximately three times the nitrogen by volume. The carbon monoxide is subjected to reaction with steam to produce an equivalent amount of hydrogen following which carbon dioxide and steam are separated from the gas stream leaving a mixture of nitrogen and hydrogen in approximately required proportions for ammonia synthesis. Undesirable impurities, such as argon and methane, are preferably removed from the product gas by washing the nitrogen-hydrogen mixture with substantially pure liquid nitrogen.

The carbonaceous fuel is reacted with oxygen-containing gas, i. e. oxygen or air, optionally including steam, in a closed, compact reaction zone at an autogenously maintained reaction temperature above about 2,000 F. and preferably in the range of 2,200 to 3,200° F. The reaction zone is free from packing and catalyst and preferably has near-minimum internal surface. The reaction may be conducted at atmospheric pressure or at an elevated pressure which may be as high as several hundred pounds per square inch, e. g. 100 or 1000 p. s. i. g. Pressures on the order of 200 to 600 p. s. i. g. are preferred. The product consists essentially of carbon monoxide and hydrogen and contains water vapor and small amounts of methane and carbon dioxide.

Air, oxygen-enriched air, or substantially pure oxygen may be employed in the production of carbon monoxide and hydrogen from the fossil carbonaceous fuel stocks used. Oxygen may be obtained from the rectification of air. Commercial oxygen plants are axailable capable of delivering large amounts of high purity oxygen. Commercial oxygen, so produced, usually contains in excess of 95 mol percent oxygen.

The amount of oxygen supplied to the reaction zone is limited so that near-maximum yield of carbon monoxide and hydrogen is obtained while at the same time maintaining the desired reaction temperature. Total oxygen requirements of the operation are somewhat in excess of that amount stoichiometrically required to convert all of the carbon in the fuel feed to carbon monoxide. Oxygen requirements for various fuels differ. With natural gas and oxygen as sole reactants, the amount of oxygen required is on the order of 5 to 20 percent in excess of the theoretical; with air and coke oven gas, for example, as much as 100 percent excess oxygen may be required. With oil as fuel, from about 0.6 to about 1.3 pounds of free oxygen and from about 0.2 to about 1.5 pounds of steam per pound of oil may be used. An example of typical feed proportions is 0.5 pound steam and 1 pound oxygen per pound of oil. With coal as fuel, from 0.4 to 1 pound of free (uncombined) oxygen is required per pound of coal together with 0.3 to 3 pounds of steam per pound of coal. An example of typical feed proportions for a bituminous coal is 0.9 pound oxygen and 2 pounds water per pound of coal.

With liquid and solid fuels, steam is preferably also supplied to the generator as a reactant. Steam serves the dual function of limiting the maximum temperature in the reactor and at the same time supplies oxygen for the reaction and produces hydrogen. The steam should be heated to a temperature as high as practical. Preferably the steam is preheated to a temperature of at least 600° F. and, advantageously, to a temperature of at least 1200° F. Carbon dioxide may be employed together with or in lieu of steam. Generally, however, steam is preferred.

Similarly, the other reactants should be preheated to a temperature as high as practical. Solid fuels advantageously are preheated by suspension in steam as described hereinafter. Air preferably is preheated to a temperature of 600° F. or higher. Because of the reactivity of pure oxygen, it is usually preferable to limit the oxygen preheat temperature to a temperature somewhat less than 600° F. Satisfactory operation may be obtained with no preheat of the oxygen feed stream. Gaseous hydrocarbons may be preheated to temperatures on the order of 600 to 1400° F. Liquid hydrocarbons generally may be heated to temperatures on the order of 600° F.

When solid fuels are employed, the solid fuel particles should not exceed an average diameter of 150 microns and are preferably 40 microns and smaller in average diameter. Mechanical grinding of the solid fuel is satisfactory; steam jet pulverization of the solid fuel is preferred since size reduction, preheating and solid material handling is secured simultaneously with the provision of steam for the gasification process.

Preferably the fuel and oxygen are separately introduced into the reaction zone and mixed therein. Introduction of the fuel and oxygen streams through concentric tubes at high velocity, e. g. 100 to 200 feet per second, is satisfactory. The reactant streams preferably are directed away from the reactor walls so that there is no direct impingement thereon, e. g. reactants are introduced axially at one end of a cylindrical reactor and reaction products are discharged from the opposite end. Reaction products may be quenched with water and the gases scrubbed with water for removal of carbon or other solids.

Carbon monoxide produced in the gas generation reactor may be made to yield an equivalent amount of hydrogen by reaction with steam. The conversion of carbon monoxide to carbon dioxide by reaction with steam to produce additional hydrogen is known as the water-gas shift reaction. This reaction is usually conducted at about 750° F. over an iron catalyst. A commercial catalyst for this reaction comprises iron oxide, promoted with oxides of chromium, potassium, magnesium and aluminum. The conversion of carbon monoxide to carbon dioxide by the water-gas shift reaction is essentially complete.

Carbon dioxide may be removed from the product gas stream following the water-gas shift reaction step by scrubbing the gas with water or with an amine, e. g. monoethanolamine, or by a combination of these procedures. Residual carbon monoxide may be substantially completely removed from the gas stream by scrubbing with an aqueous solution of cuprous ammonium chloride ($Cu(NH_3)_2Cl$) which also removes any remaining carbon dioxide. Various other salts may be used for the removal of carbon monoxide, as is known in the art. Sometimes it is desirable to employ a caustic wash, i. e. contact between the gas and a solution of sodium hydroxide, following other purification steps, to remove residual carbon dioxide from the gas stream.

The synthesis of ammonia is effected by reacting nitrogen with hydrogen in the presence of a suitable catalyst. Three volumes of hydrogen are required per volume of nitrogen. In the usual commercial processes, the ammonia synthesis reaction is conducted at a pressure of several thousand pounds per square inch, suitably 5000 and higher, and at an elevated temperature, suitably around 950° F. One of the commercial catalysts is prepared by admixing oxides of potassium and aluminum as promoters with magnetic iron oxide which is subsequently reduced to metallic iron. In commercial operations, low conversion per pass is obtained, i. e. only a limited amount of the nitrogen-hydrogen mixture is converted to ammonia each time it passes over the catalyst. Commonly, from 8 to 12 percent of the feed mixture is converted per pass over the catalyst. Unconverted nitrogen and hydrogen are recycled. Roughly 90 percent of the feed to the converter represents recycled gas.

Undesirable gases, notably hydrocarbons and inert atmospheric gases, tend to accumulate in the ammonia synthesis gas in the conversion section. It is customary to purge a portion of the recycled gas stream to prevent build-up in concentration of undesirable gases in the converter. As a result of this purge, generally only about 85 percent of the hydrogen, which has been made and purified at considerable expense, is ultimately converted to ammonia. To prevent this wasteful loss of hydrogen it is essential that the hydrocarbon content, essentially methane, of the feed gas stream be kept at a low value, e. g. below about 0.3 mol percent.

The cost of the oxygen from an oxygen plant represents an item of considerable expense in the generation of synthesis gas by partial oxidation. Ordinarily the oxygen plant is designed to supply all of the free oxygen required for the partial oxidation reactions as a concentrate of at least 95 percent purity by volume and the requisite nitrogen for the ammonia synthesis reaction as a concentrate containing in excess of 99 percent nitrogen by volume. While this conventional operation is entirely satisfactory from an operational standpoint, the process of this invention effects a considerable savings in oxygen costs. The present process permits generation of a given amount of ammonia synthesis feed gas with a minimum investment in oxygen facilities. Alternatively, and quite often more important, this invention provides a means for increasing the synthesis gas generation capacity of an existing plant without increasing the oxygen plant capacity.

An object of the present invention is to provide an improved process for the preparation of ammonia synthesis feed gas.

Another object is to provide a process for producing ammonia synthesis feed gas containing essentially no unreactive gases.

Still another object is to provide a process for producing ammonia synthesis feed gas by partial oxidation of carbonaceous fuels with a minimum requirement of concentrated oxygen.

A further object is to provide a process for producing ammonia synthesis feed gas of exceptionally high purity.

The process of this invention will be readily understood from the following description, with reference to the accompanying drawings. The drawings are diagrammatic flow sheets illustrating several ways of carrying out the process of this invention.

Referring to Figure 1, air is rectified in an oxygen plant 6, producing an oxygen-rich fraction and a nitrogen-rich fraction. Oxygen from the oxygen plant is supplied to a plurality of synthesis gas generators 7 wherein it is reacted with one or more carbonaceous fuels, e. g. a gaseous or liquid hydrocarbon, or a solid fuel, such as coal, to produce carbon monoxide and hydrogen. In a separate generator 8, which may be identical with generators 7, carbonaceous fuel, either the same as or different from that supplied to generators 7, is reacted with air to produce a mixture of hydrogen, carbon monoxide and nitrogen.

The effluent stream from generator 8 is combined with the product streams from generators 7 to produce a composite mixture of carbon monoxide, hydrogen and nitrogen. The composite mixture is fed to a shift converter 9 where the carbon monoxide is reacted with steam to produce carbon dioxide and hydrogen. The effluent from the shift converter is sent to purification system 10 in which carbon dioxide, and unreacted steam and carbon monoxide are removed from the gas stream. The gas stream leaving the purification system is essentially nitrogen and hydrogen, containing a minor amount of argon (from the air and oxygen supplied to the generators) and unconverted hydrocarbon (primary methane). A minor amount of methane appears in the product gas from the reactors regardless of whether a hydrocarbon or a solid carbonaceous fuel is used. The purified gas stream from the nitrogen wash may be sent directly to the ammonia synthesis reactors.

In a preferred embodiment, the nitrogen-hydrogen mixture leaving the purification system 10 is subjected to additional purification to remove the methane and argon from the gas stream. This may be accomplished by a nitrogen wash step 11, in which the nitrogen-hydrogen stream is contacted with liquid nitrogen obtained from the oxygen plant. Washing the gas stream with liquid nitrogen condenses out argon and residual hydrocarbons. Any water, carbon dioxide or carbon monoxide not completely removed by the purification step 10 is also removed in the nitrogen wash step. The purified ammonia synthesis feed gas leaving the nitrogen wash 11 is a mixture of nitrogen and hydrogen of very high purity.

Figure 2:
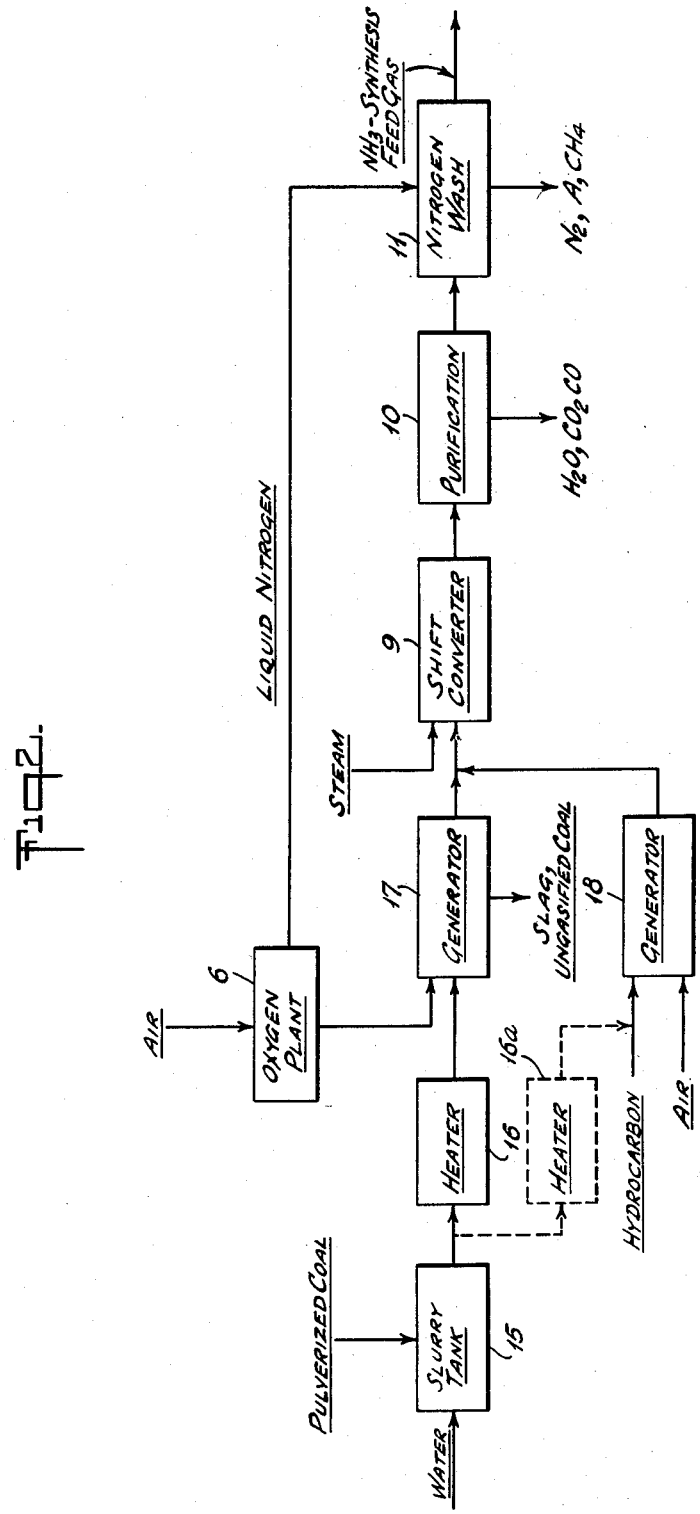

Figure 2 illustrates an embodiment wherein at least part of the fossil carbonaceous fuel is pulverized coal. Pulverized coal is slurried with water in tank 15 and heated to form a suspension of coal in steam in heater 16. Oxygen from oxygen plant 6 is supplied to generator 17 wherein it is reacted with the pulverized coal to produce carbon monoxide and hydrogen. In a separate generator 18, which may be generally like generator 17 but of somewhat smaller capacity, a hydrocarbon, e. g. natural gas or oil, is reacted with air to produce a mixture of hydrogen, carbon monoxide and nitrogen. Alternatively, or supplementally, additional coal slurry from tank 15 may be passed through heater 16a to generator 18.

The product streams from generators 17 and 18 are combining to produce a composite mixture of carbon monoxide, hydrogen and nitrogen. The composite mixture is treated in shift converter 9, purification system 10 and liquid nitrogen wash system 11 as hereinbefore described to produce a mixture of nitrogen and hydrogen of very high purity.

The purity of the gas stream depends to a large extent on the purity of the nitrogen available from the oxygen plant. Commercial oxygen plants may be operated to produce nitrogen of over 99.5 volume percent purity. Nitrogen of at least 99.5 percent purity is preferred in the present process.

Nitrogen may be added to or taken from the gas stream in the nitrogen wash step, depending on the conditions under which the step is operated. If all of the refrigeration required to cool the gas stream (from about atmospheric temperature) to the temperature of liquid nitrogen comes from the liquid nitrogen itself, nitrogen will be added to the gas stream in passing through the nitrogen wash. However, the nitrogen wash step may be operated with supplemental refrigeration so that some nitrogen is condensed from the gas stream and the nitrogen content of the gas stream reduced.

Gaseous nitrogen may be supplied, as necessary, to the ammonia synthesis feed gas stream from the oxygen plant.

The operation of my process will be clear from the following examples wherein several variations of the process are described in detail. The pressures, temperatures and other operating conditions given therein are to be taken as illustrative and not as limiting. It will be evident to those skilled in the art that other equivalent process steps may be substituted for the specific steps described in the examples.

EXAMPLE 1

Air is rectified in a commercial oxygen plant to produce an oxygen stream of 95 percent purity (by volume) and nitrogen of 99.7 percent purity. The oxygen is supplied at 295° F. to four flow-type synthesis gas generators. Natural gas of the following composition is heated to 915° F. and supplied to the generators.

*Natural gas*

| Component: | Amount (vol. percent) |
|---|---|
| Methane | 87.1 |
| Ethane | 7.9 |
| Propane and heavier | 2.0 |
| Nitrogen | 1.9 |
| Carbon dioxide | 1.1 |

The natural gas and oxygen streams are separately introduced to the generators and mixed within the generators. The gas generators are unpacked cylindrical reactors, each with an internal volume of 33 cubic feet. The length of each reactor is about two and one half times its diameter resulting in a small amount of internal surface relative to its volume. The generators are operated at a pressure of 300 p. s. i. g. A temperature of 2600° F. is autogenously maintained by the reaction between the oxygen and the natural gas. Natural gas is fed at the rate of 239,800 standard cubic feet (at 60° F. and 1 atmosphere) per hour, and oxygen, at the rate of 164,600 standard cubic feet per hour. The product gas (on a water-free basis) has the following composition.

*Synthesis gas (A)*

| Component: | Amount (vol. percent) |
|---|---|
| Carbon monoxide | 36.0 |
| Hydrogen | 59.8 |
| Carbon dioxide | 2.0 |
| Methane | 0.2 |
| Nitrogen and argon | 2.0 |

Air and natural gas, each separately preheated to 1100° F., are fed to a separate synthesis gas generator of the same type as those described above. Natural gas is fed at the rate of 49,600 standard cubic feet per hour, and air, at the rate of 219,400 standard cubic feet per hour, autogenously maintaining the temperature at 2600° F. The product gas from this generator (on a dry basis) has the following composition.

*Synthesis gas (B)*

| Component: | Amount (vol. percent) |
|---|---|
| Carbon monoxide | 15.9 |
| Hydrogen | 23.2 |
| Carbon dioxide | 2.3 |
| Methane | 0.2 |
| Nitrogen and argon | 58.4 |

The product gas streams from all the gas generators are mixed and passed to a shift converter where the carbon monoxide is reacted with steam. In the shift converter the carbon monoxide is almost completely converted to carbon dioxide. The shift reactor employs an iron catalyst and operates at about 760° F. The product gas from the shift converter contains approximately 2 percent by volume residual carbon monoxide on a dry, carbon dioxide-free basis.

Following the shift converter, the gas is subjected to purification: first, by cooling to condense water, then, by scrubbing with monoethanolamine solution to remove carbon dioxide followed by scrubbing with a 10 percent solution of sodium hydroxide. The purification steps effect removal of most of the water, and substantially all of the carbon dioxide from the gas stream. The resulting purified gas stream still contains a small amount of carbon monoxide (1 to 2 percent), residual hydrocarbon from the gas generators (0.1 to 0.5 percent) and argon (less than 1 percent). The argon enters the system in the air and oxygen supplied to the generators. This mixture may be supplied to the ammonia synthesis reactors.

Optionally, and preferably, the gas is further purified by subjecting the gas stream to a liquid nitrogen wash operation. In this particular example, the gas, after leaving the caustic scrubber, is cooled to a temperature of about 40° F. while under a pressure of 300 pounds per square inch gauge. Condensate water is separated from the gas stream and the partially dried gas then passed through a chemical drier containing alumina to reduce the water content of the gas stream to less than 2 parts per million. The dry gas stream is then cooled to approximately —315° F. in heat exchangers and introduced into a multiple plate wash tower where the cooled gas is intimately contacted with liquid nitrogen of 99.7 percent purity obtained from the air rectification plant. The liquid nitrogen flowing down the tower condenses argon, carbon monoxide and methane from the gas stream, so that the gas leaving the top of the tower is essentially free from these components. The cold gas from the top of the tower is passed in heat exchange with the incoming gas stream. A mixture of liquid nitrogen, argon, and carbon monoxide is withdrawn from the bottom of the nitrogen wash tower. The nitrogen wash in this specific example is conducted at a pressure of approximately 275 pounds per square inch gauge.

Under the above conditions, 70,000 standard cubic feet per hour of nitrogen is added to the gas stream in the nitrogen wash tower. Synthesis gas consisting of 3 parts hydrogen to 1 part nitrogen is produced at the rate of 1,012,560 standard cubic feet per hour. This is sufficient for synthesis of 260 tons of anhydrous ammonia per day.

EXAMPLE 2

Bituminous coal, pulverized so that 70 percent is finer than 200 mesh, is slurried with water and pumped at about 1200 p. s. i. g. into a slurry preheating coil wherein it is heated to 1000° F. The slurry is fed at the rate of 8,111 pounds per hour of coal and 7,812 pounds per hour of water through the preheater wherein the water is converted into steam.

The resulting dispersion of powdered coal and steam is discharged into the top of vertical flow-type cylindrical synthesis gas generator A having internal volume of about 40 cubic feet. The reactor length is about two and one half times its diameter. By preheating and discharging the coal into the generator with the steam, a highly reactive dispersion of fuel is obtained. Composition of the coal feed in weight percent (dry basis) is as follows:

| Component: | Weight percent |
|---|---|
| Sulfur | 2.59 |
| Nitrogen | 1.50 |
| Carbon | 77.29 |
| Hydrogen | 4.93 |
| Oxygen | 5.38 |
| Ash | 8.31 |

Air is rectified in a commercial oxygen plant to produce an oxygen stream of 95 volume percent purity and a nitrogen stream of 99.7 volume percent purity. The oxygen is supplied at 530 p. s. i. g. and 300° F. into synthesis gas generator A and admixed with the stream of coal and stream within the generator. The oxygen feed rate is 89,617 standard cubic feet per hour. Generator pressure is maintained at 500 p. s. i. g. and temperature at 2,500° F. Molten slag, ungasified coal and product gas are discharged through an opening in the bottom of the generator and quenched with soft water. Product gas of the following volumetric composition is separated off at the rate of 304,750 S. C. F. H. (measured on a dry basis).

| Component: | Volume percent |
|---|---|
| Carbon monoxide | 45.3 |
| Hydrogen | 36.7 |
| Carbon dioxide | 14.7 |
| Methane | 0.4 |
| Nitrogen | 0.9 |
| Monatomic gases [1] | 1.2 |
| Hydrogen sulfide | 0.7 |
| Carbonyl sulfide | 0.1 |

[1] Rare atmospheric gases (mainly argon).

Additional pulverized coal and soft water are slurried and preheated in the same way and in the same proportions as described hereinbefore, then fed into the top of another vertical flow-type synthesis gas generator, denoted herein as generator B. Generator B has internal volume of about 23 cubic feet and a low ratio of internal surface relative to its volume. The slurry feed rate to generator B is 1367 pounds per hour of coal and 1309 pounds per hour of water. Air, preheated to 1,000° F., is supplied at 525 p. s. i. g. and a rate of 87,240 S. C. F. H. to generator B and admixed with the coal and steam flows at the point of their introduction into said generator. Pressure and temperature in generator B are the same as those in generator A.

Molten slag and product gas are discharged through an opening in the bottom of generator B and quenched with soft water. Product gas of the following volumetric composition is produced at the rate of 115,815 standard cubic feet per hour (measured on a dry basis):

| Component: | Volume percent |
|---|---|
| Carbon monoxide | 18.1 |
| Hydrogen | 13.0 |
| Carbon dioxide | 8.6 |
| Methane | 0.2 |
| Nitrogen | 59.1 |
| Monatomic gases | 0.7 |
| Hydrogen sulfide | 0.3 |

The product gas streams from generators A and B are mixed and treated in essentially the same manner as is described in Example 1, i. e. passed with added steam into a shift converter wherein the carbon monoxide is reacted with steam, cooled, scrubbed free of carbon dioxide and washed with liquid nitrogen for final purification.

Under the above conditions 26,536 S. C. F. H. nitrogen is added to the gas stream in the nitrogen wash tower, and purified ammonia synthesis gas consisting of three volume parts of hydrogen to one volume part of nitrogen is produced at the rate of 383,640 S. C. F. H. This is sufficient for synthesis of about 103 tons per day of anhydrous ammonia.

EXAMPLE 3

In this case commercial oxygen and slurried bituminous coal are fed to generator A in the same way as is described in Example 2 to produce an unpurified synthesis gas of the same kind, while generator B is operated on air and natural gas of the composition shown in Example 1.

The air and natural gas, each separately preheated to 1,100° F., are fed to generator B, the natural gas at the rate of 20,301 S. C. F. H. and the air at 89,727 S. C. F. H. to produce 121,961 standard cubic feet per hour of product gas from generator B having composition essentially the same as that of synthesis gas B shown in Example 1.

The product gas streams from generators A and B are mixed for subsequent shift conversion of the carbon monoxide in the mixed streams into hydrogen. The mixed streams are treated essentially in the same manner as is described in Example 1, i. e. subjected to shift conversion with added steam then cooled, scrubbed free of carbon dioxide and further purified by washing with liquid nitrogen.

Under the above conditions 27,613 S. C. F. H. nitrogen is added to the purified gas stream in the nitrogen wash tower and purified ammonia synthesis gas consisting of three volume parts hydrogen and one volume part nitrogen is produced at the rate of 399,165 S. C. F. H. This is sufficient for about 107 tons of anhydrous ammonia per day.

EXAMPLE 4

In this case commercial oxygen and slurried bituminous coal are fed to generator A the same way as is described in Example 2, to produce an unpurified synthesis gas of the same kind, while generator B is operated on air and a cycle fuel oil from refinery operations. This oil has an API gravity of 4.5, Saybolt Furol viscosity of 259 at 122° F., and has the following approximate analysis:

| Component: | Weight percent |
|---|---|
| Carbon | 89.0 |
| Hydrogen | 9.0 |
| Nitrogen | 1.0 |
| Sulfur | 1.0 |

The oil is preheated, atomized with steam, and reacted with air in generator B at 2,630° F. and 500 p. s. i. g. The feed consists of 87,745 S. C. F. H. of air, 1,096 lbs. per hour of oil and 331 lbs. per hour of steam. The oil and steam mixture enters the generator at 550° F., and the air at 150° F. Raw synthesis gas from generator B, 117,178 S. C. F. H. has the following approximate analysis on a dry basis:

| Component: | Volume percent |
|---|---|
| Hydrogen | 16.0 |
| Carbon monoxide | 18.0 |
| Carbon dioxide | 6.6 |
| Nitrogen and argon | 59.1 |
| Methane | 0.2 |
| Hydrogen sulfide | 0.1 |

Product gas streams from generators A and B are mixed for subsequent shift conversion of the carbon monoxide in the mixed streams into hydrogen. The mixed streams are treated essentially in the same manner as described in Example 1, i. e. subjected to shift conversion with added steam, cooled, scrubbed free of carbon dioxide and further purified by washing with liquid nitrogen.

Under the above conditions 26,885 S. C. F. H. of nitrogen is added to the purified gas stream in the nitrogen wash tower and purified ammonia synthesis gas consisting of three volume parts hydrogen and one volume part nitrogen is produced at the rate of 388,618 S. C. F. H. This is sufficient for about 104 tons of anhydrous ammonia.

It will be evident that the nitrogen wash may be operated, if desired, at a pressure and temperature such that nitrogen is added to the gas stream undergoing treatment or under conditions such that nitrogen is removed from the gas stream. Gaseous nitrogen is available from the oxygen plant. This gaseous nitrogen may be used, if desired, to supplement nitrogen from the other sources, i. e. from the air and oxygen introduced into the generators and the nitrogen introduced in the nitrogen wash. Thus, any deficiency in the nitrogen content of the gas stream at the point of discharge from the nitrogen wash tower may be readily supplied from the oxygen plant. In some instances, it may be desirable to control the final composition of the gas stream by the addition of small amounts of nitrogen, as required, from the oxygen plant.

The foregoing description and examples relate to preferred operating conditions for the various feed streams useful in the present invention process. It is to be understood, however, that the operating conditions are illustrative only and that the process may be operated under other conditions for example, at higher or lower pressures and temperatures, without departing from the spirit of my invention.

Obviously, many modifications and variations of the invention, as hereinbefore set forth, may be made without departing from the spirit and scope thereof, and therefore only such limitations should be imposed as are indicated in the appended claims.

I claim:

1. A process for the production of a mixture of hydrogen and nitrogen in the relative proportions of approximately three volumes of hydrogen per volume of nitrogen which comprises reacting fossil carbonaceous fuel in a first reaction zone with an oxygen-containing gas comprising substantially pure oxygen as the sole source of free oxygen at a temperature above about 2250° F. in relative proportions such that the carbon content of said fuel is substantially completely converted to carbon monoxide, subjecting additional fossil carbonaceous fuel to reaction with air in a second reaction zone at a temperature above about 2250° F. in relative proportions such that the carbon content of said fuel is substantially completely converted to carbon monoxide, forming a mixture containing carbon monoxide and nitrogen; combining the products of said reactions comprising carbon monoxide and nitrogen together with any hydrogen concomitantly produced in relative proportions such that the composite stream contains at least three volumes of carbon monoxide and hydrogen per volume of nitrogen; subsequently converting carbon monoxide in said composite stream substantially completely to carbon dioxide by reaction with steam thereby producing hydrogen; and removing steam and carbon oxides from the resulting gas stream thereby producing a gaseous mixture of hydrogen and nitrogen containing approximately three volumes of hydrogen per volume of nitrogen.

2. A process according to claim 1 wherein the fuel supplied to at least one of said reaction zones is a finely divided solid carbonaceous fuel.

3. A process according to claim 1 wherein the carbonaceous fuel supplied to at least one of said reaction zones is a hydrocarbon.

4. A process according to claim 1 in which a pressure of at least 100 p. s. i. g. is maintained in each of said reaction zones.

5. A process for the production of a mixture of hydrogen and nitrogen in the relative proportions of approximately three volumes of hydrogen per volume of nitrogen which comprises reacting fossil carbonaceous fuel in a first reaction zone with an oxygen-containing gas comprising substantially pure oxygen as the sole source of free oxygen at a temperature above about 2250° F. in relative proportions such that the carbon content of said fuel is substantially completely converted to carbon monoxide, subjecting additional fossil carbonaceous fuel to reaction with air in a second reaction zone at a temperature above about 2250° F. in relative proportions such that the carbon content of said fuel is substantially completely converted to carbon monoxide, forming a mixture containing carbon monoxide and nitrogen; combining the products of said reactions comprising carbon monoxide and nitrogen together with any hydrogen concomitantly produced in relative proportions such that the composite stream contains at least three volumes of carbon monoxide and hydrogen per volume of nitrogen; subsequently converting carbon monoxide in said composite stream substantially completely to carbon dioxide by reaction with steam thereby producing hydrogen; removing steam and carbon oxides from the resulting gas stream; thereafter contacting the resulting gas stream with an excess of liquid nitrogen thereby effecting removal of gases other than hydrogen and nitrogen therefrom, and adding sufficient nitrogen to form a mixture of three volumes of hydrogen per volume of nitrogen.

6. A process for the production of a mixture of hydrogen and nitrogen in the relative proportions of approximately three volumes of hydrogen per volume of nitrogen which comprises reacting a stream of hydrocarbon with substantially pure oxygen at a temperature above about 2250° F. in an unpacked reaction zone in relative proportions such that said hydrocarbon and oxygen are substantially completely converted to carbon monoxide and hydrogen; subjecting a second stream of hydrocarbon to reaction with air in a second unpacked reaction zone at a temperature above about 2250° F. in relative proportions such that said hydrocarbon and air are substantially completely converted to a mixture of carbon monoxide, hydrogen and nitrogen; combining the products of said reactions in relative proportions such that the composite stream contains at least three volumes of carbon monoxide and hydrogen per volume of nitrogen; subsequently converting carbon monoxide in said composite stream substantially completely to carbon dioxide by reaction with steam thereby producing hydrogen; removing steam and carbon oxides from the resulting gas stream; thereafter contacting the resulting gas stream with an excess of liquid nitrogen thereby effecting removal of gases other than hydrogen and nitrogen therefrom, and adding sufficient nitrogen to form a mixture of three volumes of hydrogen per volume of nitrogen.

7. A process for the production of a mixture of substantially pure hydrogen and nitrogen in the relative proportions of approximately three volumes of hydrogen per volume of nitrogen which comprises separating air by rectification into an oxygen-rich fraction containing in excess of about 95 volume percent hydrogen and a nitrogen-rich fraction containing about 99 volume percent nitrogen, reacting fossil carbonaceous fuel in a first reaction zone at a temperature above about 2250 F. with said oxygen-rich fraction in relative proportions such that the carbon content of said fuel is substantially completely converted to carbon monoxide subjecting additional fossil carbonaceous fuel to reaction with air in a second reaction zone at a temperature above about 2250° F. in relative proportions such that the carbon content of said fuel is substantially completely converted to carbon monoxide from a mixture comprising nitrogen, carbon oxides, unconverted hydrocarbon and inert atmospheric gases together with any hydrogen concomitantly produced in said reactions in relative proportions such that the composite stream contains at least three volumes of carbon monoxide and hydrogen per volume of nitrogen subsequently converting carbon monoxide in the resulting mixture substantially completely to carbon dioxide by reaction with steam with the concomitant production of hydrogen removing steam and carbon oxides from the resulting gas stream contacting the resulting gas stream with an excess of liquid nitrogen from said nitrogen-rich fraction thereby effecting condensation of carbon monoxide, unconverted hydrocarbons and inert atmospheric gases therefrom, and adding sufficient nitrogen to said gas stream to form a mixture containing three volumes of hydrogen per volume of nitrogen substantially free from other gases.

8. A process for the production of a mixture of hydrogen and nitrogen in the relative proportions of approximately three volumes of hydrogen per volume of nitrogen which comprises separating air by rectification into fractions comprising an oxygen-rich fraction containing in excess of 95 volume percent oxygen and a nitrogen-rich fraction containing in excess of about 99 volume percent nitrogen; reacting a stream of hydrocarbon with said oxygen-rich fraction at a temperature above about 2250° F. in an unpacked reaction zone in relative proportions such that said hydrocarbon and oxygen are substantially completely converted to carbon monoxide and hydrogen; subjecting a second stream of hydrocarbon in a second unpacked reaction zone at a temperature above about 2250° F. to reaction with air in relative proportions such that said hydrocarbon and air are substantially completely converted to a mixture of carbon monoxide, hydrogen and nitrogen; combining products of said reactions in relative proportions such that the composite stream contains at least three volumes of carbon monoxide and hydrogen per volume of nitrogen; subsequently converting carbon monoxide in said composite stream substantially completely to carbon dioxide by reaction with steam; removing steam and carbon oxides from the resulting gas stream; thereafter contacting the resulting gas stream wtih said nitrogen-rich fraction in liquid phase employing an excess of liquid nitrogen thereby effecting removal of gases other than hydrogen and nitrogen therefrom; and adding sufficient nitrogen to form a mixture of three volumes of hydrogen per volume of nitrogen.

References Cited in the file of this patent

UNITED STATES PATENTS

| | | |
|---|---|---|
| 1,716,813 | Casale | June 11, 1929 |
| 1,957,744 | Wietzel et al | May 8, 1934 |
| 2,042,665 | Kinzel | June 2, 1936 |
| 2,582,938 | Eastman et al. | Jan. 15, 1952 |

FOREIGN PATENTS

| | | |
|---|---|---|
| 231,218 | Great Britain | Mar. 26, 1925 |
| 289,080 | Great Britain | July 15, 1929 |